United States Patent [19]

Larson

[11] Patent Number: 4,847,865
[45] Date of Patent: Jul. 11, 1989

[54] AUTOMATIC THRESHOLD ADJUSTMENT CIRCUIT FOR DIGITAL DATA COMMUNICATION

[75] Inventor: Gary L. Larson, Waseca, Minn.
[73] Assignee: AMP Incorporated, Harrisburg, Pa.
[21] Appl. No.: 51,874
[22] Filed: May 18, 1987
[51] Int. Cl.[4] .......................................... H04L 75/06
[52] U.S. Cl. ..................................... 375/76; 307/359
[58] Field of Search ................. 375/76; 307/350, 356, 307/358, 359; 328/115, 146; 330/240, 290

[56] References Cited

U.S. PATENT DOCUMENTS

| | | | |
|---|---|---|---|
| 3,176,236 | 3/1965 | Abbot et al. | 330/290 |
| 3,509,279 | 4/1970 | Martin et al. | 375/76 |
| 4,241,455 | 12/1980 | Eibner | 455/600 |
| 4,387,465 | 6/1983 | Becker | 375/76 |
| 4,459,699 | 7/1984 | Monticelli et al. | 375/76 |

FOREIGN PATENT DOCUMENTS

81/02653 9/1981 European Pat. Off. .

OTHER PUBLICATIONS

Document entitled "A Noise Immune 32M6/S Optical Data Link", Sixth European Conference on Optical Communication, York, Sep. 1980, pp. 458–461.

Primary Examiner—Benedict V. Safourek
Assistant Examiner—Michael Ricci
Attorney, Agent, or Firm—David L. Smith

[57] ABSTRACT

An improved threshold circuit (30) for reconstructing digitally-encoded, optically-transmitted signals is disclosed. The threshold circuit (30) automatically compensates for amplitude variations in the received signal due to noise, gain variations, and the like, and thereby provides improved accuracy in reproduction of the digitally-encoded signal. An amplifier (120) generates an output signal the level of which, under low signal amplitude, is linearly related to the instantaneous level of the digitally-encoded input signal. An active low pass linear filter (122, 124, 132) generates from the amplified output signal a signal the level of which corresponds to the average level of the amplified output signal. A bias signal generator (40) receives the average level signal on one input and a selected reference signal on the other. The bias generator (40) outputs a bias signal the level and polarity of which are related to the degree and polarity of difference between the average level signal and the reference signal. The bias signal biases the linear amplifier (120) to compensate for any variations of the average level of the amplified input signal from a selected threshold value that corresponds to the reference signal. A trigger circuit (45) converts the bias-controlled, amplified signal to digital square wave pulses corresponding to the transmitted digitally-encoded signal.

6 Claims, 1 Drawing Sheet

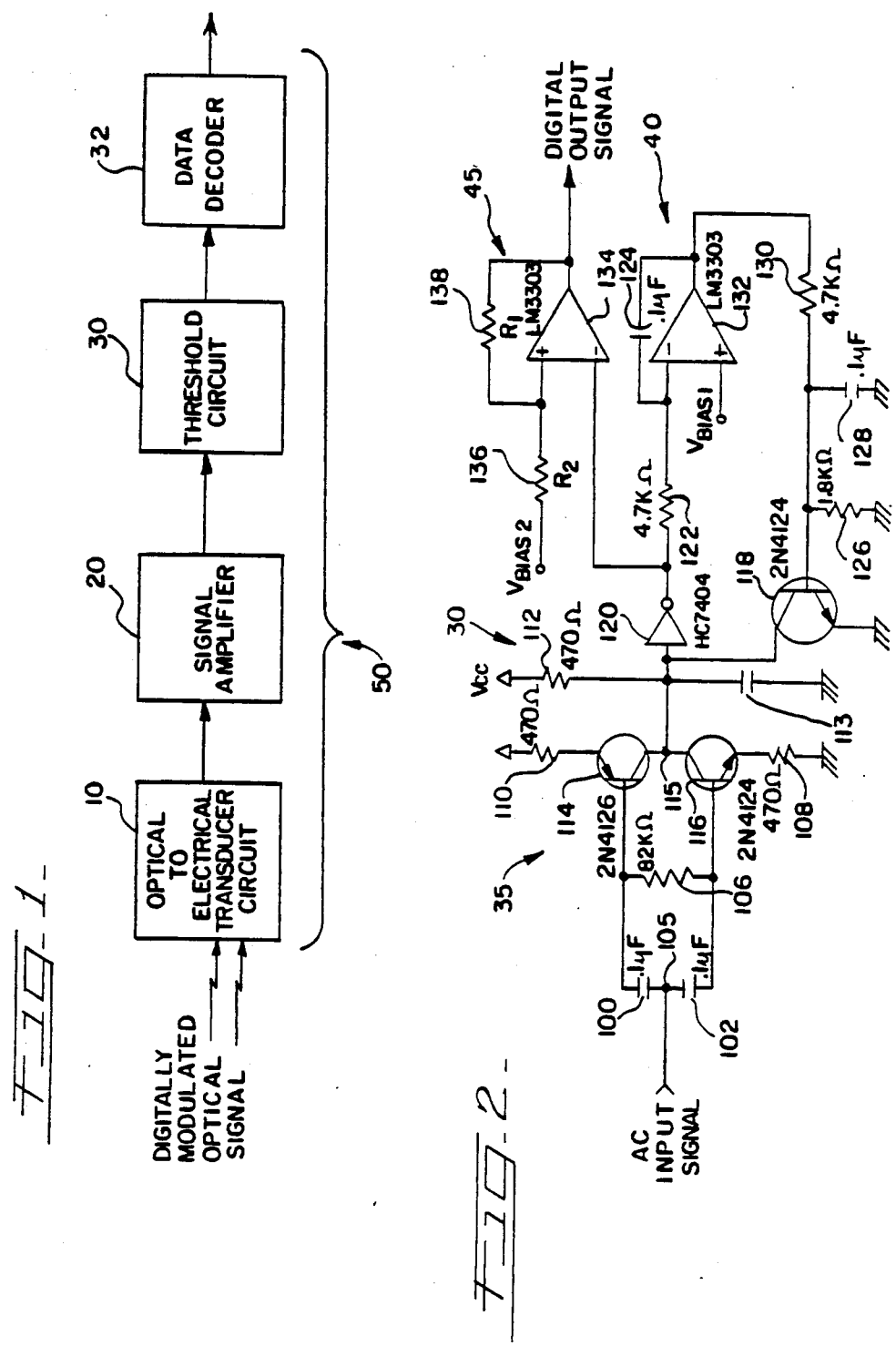

4,847,865

AUTOMATIC THRESHOLD ADJUSTMENT CIRCUIT FOR DIGITAL DATA COMMUNICATION

BACKGROUND OF THE INVENTION

1. Field of the Invention

This invention relates generally to the field of signal receiver and demodulator circuits, and more specifically to circuits adapted to receive and demodulate digitally-modulated, optically transmitted signals. The invention is particularly concerned with threshold circuits that are commonly used in such receiver circuits and with an improved threshold circuit that provides automatic adjustment of the signal threshold level.

2. Statement of Related Art

A common method of transmitting digital data in local area networks and the like involves modulating the intensity of a light source in accordance with the digital data and optically transmitting the modulated light signal over an optical transmission medium, such as a fiber optic cable. Receiver circuits designed to receive and demodulate digitally-modulated, optically-transmitted signals typically include an optical to electrical transducer that converts the optical signal to an electrical signal, a Signal Amplifier that amplifies the converted electrical signal, a threshold circuit that reconstructs the transmitted digitally-encoded signal from the electrical signal, and a demodulator circuit that converts the reconstructed signal into data bit values. Threshold circuits in common use typically generate a constant threshold voltage, compare the amplitude of the converted, amplified, electrical signal with the threshold or decision value, and output a digital signal having one predetermined logic level when the amplitude of the received signal exceeds the threshold, and a second predetermined logic level when it does not.

Such threshold circuits possess several major deficiencies that increase the likelihood of erroneous reconstruction and demodulation of the transmitted signal. For example, in such threshold circuits, the threshold voltage must typically be set so high that under no condition can variations in transmitter or receiver gain or in the level of noise produce a spurious output signal. However, due to the relatively large degree of signal attenuation inherent in commonly-used optical transmission media, the level of the received signal is typically relatively low. In addition, the signal to noise ratio of such signals is typically low. Since such threshold circuits are in effect "desensitized", inaccurate reconstruction and demodulation of these relatively low level, noisy signals may thus occur.

In addition, the threshold level in such threshold circuits is typically set according to the rated gain of the Signal Amplifier and the rated sensitivity of the optical transducer, both of which may vary in operation with time and temperature. Also, such threshold circuits can introduce timing distortion into the reconstructed digitally-encoded signal. This problem occurs because some such circuits react more rapidly to transitions in the amplitude of the electrical signal from below to above the threshold than to transitions from above to below the threshold.

In view of the foregoing deficiencies in the prior art threshold circuits, it is an object of the present invention to provide an improved threshold circuit that automatically adjusts the threshold level to compensate for variations in the amplitude of the received signal due to variations in gain and sensitivity of the various receiver components, variations in noise level, and the like. In so doing, the improved threshold circuit of the invention greatly increases the accuracy of detection, reconstruction, and demodulation of the received signal.

It is another object of the invention to provide an improved threshold circuit that automatically adjusts the signal threshold level to eliminate timing distortion in reconstructed digitally-encoded signals, thereby greatly improving the accuracy of the reconstructed signals.

It is another object of the invention to provide an improved threshold circuit that is suitable for use in typical optical receiver circuits to reproduce digitally-encoded, optically-transmitted signals.

SUMMARY OF THE INVENTION

The foregoing objects and attendant advantages are achieved by providing a threshold adjustment circuit having a first portion that generates from a received signal a first signal having a parameter related to the average level of the modulated signal, and a second portion that generates from the first signal a second signal that opposes variations of the parameter of the first signal from a selected threshold value.

BRIEF DESCRIPTION OF THE DRAWING

The novel features that are believed to be characteristic of the invention are set forth in the appended claims. The invention itself, together with the foregoing objects and attendant advantages thereof, will be best understood by reference to the following detailed description of the presently preferred embodiment thereof, taken in conjunction with the accompanying drawing, in which:

FIG. 1 is a block diagram illustrating generally the components of a typical optical receiver in which the threshold circuit of the invention may find use; and FIG. 2 is an electrical schematic diagram illustrating the presently preferred embodiment of the improved threshold circuit of the invention in detail.

DESCRIPTION OF THE PREFERRED EMBODIMENT

Referring to the drawings, FIG. 1 is a block diagram which illustrates generally the major components of a typical optical receiver circuit 50. Such circuits are used in a variety of applications including, for example, digital communications applications such as local area computer networks and local communication and control systems. The optical receiver circuit 50 is generally comprised of an optical-to-electrical transducer circuit 10, a small signal amplifier circuit 20, a threshold circuit 30, and a data demodulator circuit 32.

The optical-to-electrical transducer circuit 10 is a conventional circuit known to those skilled in the art. It typically includes a conventional light-sensitive electronic component (not shown) such as a photo-diode or photo-transistor. The light sensitive component is mounted adjacent to an end of a fiber optic cable (not shown) or other optical transmission medium over which an optical signal is transmitted. Typically, the optical signal is encoded with digital data by intensity-modulating it in accordance with the states of the data to be transmitted. However, other modulation schemes may also be used. The light-sensitive electronic element detects the digitally-encoded optical signal and converts it into a corresponding low-level AC electrical signal. The optical-to-electrical transducer circuit 10 may also include a variety of other conventional biasing and amplifying components, descriptions of which are not necessary for a full understanding and appreciation of the invention.

The output of the optical-to-electrical transducer circuit 10 is typically connected to the input of the AC signal amplifier 20. The Signal Amplifier 20 is also a conventional circuit that is known to those skilled in the art. Any of a wide variety of transistor or operational amplifier circuits having bandwidth sufficient to reproduce a square wave input signal with reasonable accuracy are suitable.

The signal output by the Signal Amplifier 20 can be a noisy, relatively low-level signal. This signal is connected to the input of the threshold circuit 30. From this signal, the threshold circuit 30 reconstructs the original optically-transmitted digitally-encoded signal at supply levels and with appropriate duty cycle. The reconstructed digitally-encoded signal may be coupled to conventional data demodulator circuitry 32 to obtain the actual digital data, or, processed by other circuitry that operates upon the raw encoded signal.

FIG. 2 is a detailed electrical schematic diagram illustrating the presently preferred embodiment of the improved threshold circuit of the invention. The threshold circuit 30 generally comprises a preamplifier 35, an amplifier 120, a bias generator 40, and a trigger circuit 45. Preferred values for the various components comprising the threshold circuit 30 are as illustrated in FIG. 2 and as described below.

The digitally-encoded signal is received at the junction of series-connected capacitors 100 and 102 which comprises the input 105 of the pre-amplifier 35. The pre-amplifier 35 comprises coupling capacitors 100 and 102; resistors 106, 108, and 110; PNP transistor 114, and NPN transistor 116. The input 105 is connected to the base of transistor 114 through the capacitor 100 and to the base of the transistor 116 through the capacitor 102. The bases of the transistors 114 and 116 are interconnected through the biasing resistor 106. The emitter of the PNP transistor 114 is connected to a +12 volt DC source $V_{cc}$ through the resistor 110, which both biases and controls the gain of the transistor 114. The emitter of the NPN transistor 116 is connected to ground through the resistor 108, which both biases and controls the gain of the transistor 116. The collectors of the transistors 114 and 116 are connected together to form a junction 115 which comprises the output of the pre-amplifier 35.

The output 115 of the pre-amplifier 35 is connected to the input of the amplifier 120. The amplifier 120 is advantageously a single-ended type amplifier which produces a single output signal. It is a feature of the invention that the amplifier 120 is continuously biased, as described below, such that it is maintained in its linear region of operation. In the preferred embodiment, the amplifier 120 is suitably a 7404 type or equivalent inverter biased to operate in its linear region. Alternatively, the amplifier 120 could be an operational or a non-inverting amplifier with appropriate phase shift in the feedback network.

Optionally, a resistor 112 connects the input of the amplifier 120 to $V_{cc}$ and a capacitor 113 connects the input of the amplifier 120 to ground. The resistor 112 may be inserted in the circuit if it is desired that the amplifier 120 have a finite input impedance rather than the extremely high impedance of the pre-amplifier 35.

The resistor 112 and $V_{cc}$ act as an additional fixed current source feeding the amplifier 120. If resistor 112 is not used, resistor 108 may be increased in value. The value of the resistor can be adjusted to vary the level of the signal input to the amplifier 120.

The capacitor 113 may be inserted if it is desired to band limit the response of the circuit to obtain better signal to noise ratio. The value selected for the capacitor 113 depends upon the value of the resistor 112, the input impedance of the amplifier 120, and the bit rate of the transmitted signal. Once the values of the resistor 112 and the input impedance of the amplifier 120 are known, the value of the capacitor 113 is selected to provide a filter having a wide enough bandwidth to accurately pass the digitally-encoded signal.

The single-ended output of the amplifier 120 is connected in parallel to the inputs of the trigger circuit 45 and the bias generator 40. The trigger circuit 45 is preferably a Schmitt trigger comprised of resistors 136 and 138 and a comparator 134. The output of the amplifier 120 is connected to the inverting input of the comparator 134. The output of the comparator 134 is fed back to the non-inverting input through the resistor 138. A bias voltage $V_{BIAS2}$ is connected to the non-inverting input of the comparator 134 through the resistor 136. The output of the comparator 134 comprises the output of the threshold circuit 30.

The bias generator 40 comprises resistors 122, 126 and 130; capacitors 124 and 128; an operational amplifier 132; and an NPN transistor 118. The output of the amplifier 120 is connected to the inverting input of the amplifier 132 through the resistor 122. The non-inverting input of the amplifier 132 is connected to a bias voltage $V_{BIAS1}$. The output of the amplifier 132 is fed back through the capacitor 124 to the inverting input. The output of the amplifier 132 is also connected to the base of the transistor 118 by the resistor 130. The emitter of the transistor 118 is connected to ground and the collector is connected to the input of the amplifier 120 thus providing an adjustable current source for biasing the amplifier 120. The resistor 126 and capacitor 128 also connect the base of the transistor 118 to ground in parallel. The value of the resistor 126 is preferably selected so that in combination with resistor 130 the transistor 118 is turned off when the output of the amplifier 132 is at its lowest level.

The preferred threshold circuit 30 takes advantage of the pre-transmission knowledge of characteristics of the transmitted signal. The essential characteristic of interest in the preferred circuit is the average DC component or level of the transmitted signal. Signals digitally-encoded according to the often-used Manchester coding scheme, for example, have a fifty percent duty cycle. Thus, such signals ideally exhibit an average DC level of zero. Since the average DC level due to other factors such as the choice of protocol and waveform can likewise be calculated prior to transmission of the signal, the average DC level of the transmitted signal can be calculated in advance. For example, assuming the selection of a protocol that contributes no average DC component, and the selection of a square wave. Manchester-encoded data format, it can be expected even prior to transmitting the coded signal that the received signal ideally will have an average DC level of approximately zero volts. Any DC component contributed by the carrier signal is blocked out at the input of the threshold circuit 30 by the coupling capacitors 100 and 102. It is understood, however, that the threshold circuit of the invention is not limited to use with encoding schemes in which the duty cycle of the encoded signal is fixed at fifty percent. Rather, it is advantageously used in conjunction with any digital data-encoding scheme wherein the duty cycle of the signal and hence the average DC component is ideally fixed and known.

With the foregoing in mind, in operation, a digitally-encoded signal is AC coupled into the pre-amplifier 35 by the capacitors 100 and 102. The source of the signal may be a low impedance source such as the optical-to-electrical transducer circuit 10 and Signal Amplifier 20 illustrated in FIG. 1 or a high impedance source such as a photodiode detector or the like, for example. The threshold circuit of the invention is not limited by the source impedance of the Optical to Electrical Transducer Circuit. The transistors 114 and 116 of the pre-amplifier 35 function as current sources driven by the digitally-encoded AC signal. The output of the pre-amplifier 35 is taken at the collectors of the transistors 114 and 116 and accordingly a high DC impedance is presented at the input of the amplifier 120. High DC impedance at the input of the amplifier 120 is preferred over low DC impedance, e.g. impedance in the range of a few ohms such as in a typical Signal Amplifier 20, so that the bias signal generated by the bias generator 40 and fed back to the input of the amplifier 120 is not driving a low impedance load.

The amplifier 120 amplifies the AC signal output by the pre-amplifier 35 and generates an amplified AC signal, the level of which is linearly related to the instantaneous level of the AC signal. The amplified AC signal is input to the trigger circuit 45 and to the bias generator 40.

The resistor 122, capacitor 124, and amplifier 132 of the bias generator 40 function as an active, low pass, linear filter which produces at the inverting input of the amplifier 132 a DC level which is related to the composite output of the amplifier 120. The bias voltage $V_{BIAS1}$ connected to the non-inverting input of the amplifier 132 establishes a reference level for the low pass filtered signal. Preferably, a value is selected for $V_{BIAS1}$ which causes the amplifier 120 to operate approximately in the center of its linear operating region when the level of the low pass filtered signal corresponds to the expected pre-transmission average DC value of the received signal in order to maximize the range of linear response of the circuit to amplitude variations in the received signal. The bias voltage $V_{BIAS1}$ can be derived from $V_{cc}$ using a resistive voltage divider, for example. The amplifier 132 generates from the signal at the inverting input and $V_{BIAS1}$ a bias signal which has a level related to the difference between the average DC level of the output of amplifier 120 and $V_{BIAS1}$ by the gain of the amplifier 132. As the difference between the average DC level of the output of amplifier 120 and $V_{BIAS1}$ increases, whether positively or negatively and whether due to component gain or sensitivity variations, noise, or other causes, the level of the bias signal increases correspondingly and with the opposite polarity. The bias signal controls the current to the base of the transistor 118 and hence the collector current thereof. The collector current biases the amplifier 120 so as to oppose variations in the average DC level of the amplified AC signal from the selected reference level established by $V_{BIAS1}$ and to adjust the average DC level of the amplified AC signal back to the reference level. The feedback system stabilizes when the average DC voltage at the output of the amplifier 120 equals $V_{BIAS1}$. The threshold circuit thus compensates the amplified AC signal for any positive or negative variations in average level from the selected reference value by automatically adjusting the bias on the amplifier 120. As a result, the received signal is automatically forced to stay within a selected threshold range and erroneous reconstruction and demodulation of the received signal due to noise, gain variations, or other causes is greatly reduced or eliminated.

Variation in the average DC level of the amplified AC signal from the selected reference level may also indicate timing distortion of the amplified AC signal. As described above, in the case of a Manchester-encoded signal, for example, the average DC level of the received signal is ideally zero because each cycle of the signal is expected to have a fifty percent duty cycle. Timing distortion that distorts the ideal duty cycle results in variations of the level of the low pass filtered signal from the reference level. The bias signal generated by the bias generator 40 also opposes such variations and adjusts the duty cycle of the amplified AC signal back to the expected value.

The trigger circuit 45 is a conventional Schmitt trigger circuit which generates a supply limited signal at the output of the comparator 134 when the level of the amplified AC signal rises above an upper threshold value and which remains at the supply level until the level of the amplified AC signal falls below a lower threshold value. As an example, where a digitally-encode signal having a fifty percent duty cycle and zero average DC voltage level is transmitted, the upper and lower threshold values are preferably selected to be spaced apart symmetrically with respect to the trigger bias voltage $V_{BIAS2}$. The relative values of the resistors 136 ($R_2$) and 138 ($R_1$) required to provide the optimal spacing of the upper and lower threshold values is determined by the value of the supply voltage $V_{cc}$ according to the following formula:

$$V_{spacing} = V_{cc}[R_2/(R_1+R_2)].$$

If the upper and lower thresholds are selected to be spaced apart by one (1) volt and a supply voltage $V_{cc}$ of +6V DC is selected, the values of the resistors 136 and 138 are preferably selected to be in a one to five ratio. Thus, if the value of resistor 136 is selected to be 1KΩ, then the value of resistor 138 is preferably 5KΩ.

$V_{BIAS2}$ is optimally selected so that $V_{BIAS1}$ is the mean value between the upper and lower threshold values. The optimal value of $V_{BIAS2}$ is calculated according to the formula:

$$V_{BIAS2} = V_{BIAS1} + R_2/R_1 [V_{BIAS1} - V_{cc}/2].$$

If, as preferred, $V_{BIAS1}$ is selected to bias amplifier 120 in the center of its linear operating region, and if, for example, $V_{BIAS1}$ is selected to be 3 volts, then in this case $V_{BIAS2}$ is calculated to also be 3 volts. As a result, the upper threshold value would thus be 3.5V and the lower threshold value would be 2.5V. Like $V_{BIAS1}$, $V_{BIAS2}$ may be derived from $V_{cc}$.

What have been described are certain aspects of an improved threshold circuit which constitutes a presently preferred embodiment of the invention. It is understood that the foregoing description and accompanying illustrations are merely exemplary and are in no way intended to limit the scope of the invention, which is defined solely by the appended claims. Various changes and modifications to the preferred embodiment will be apparent to those skilled in the art. Such changes and modifications can be made without departing from the spirit and scope of the invention. Accordingly it is intended that all such changes and modifications and all other equivalents be covered by the appended claims.

I claim:

1. Adjustable threshold circuit apparatus for reconstructing a transmitted, data-encoded signal from a corresponding received signal, said apparatus comprising:

an inverter which has a linear operating region and which generates from said received signal a first signal having a level related to the instantaneous level of said received signal;

means connected to said inverter for generating from said first signal a second signal having a level related to the average level of said first signal;

bias generator means having a threshold signal having a pre-selected constant level, said bias generator means being connected to said inverter and being responsive to said second signal and said threshold signal for generating a bias signal, the level of which varies in a predetermined relationship with variations of said second signal from said threshold level; and means connecting said bias generator means to said inverter and responsive to said bias signal for biasing said inverter to oppose variations in the level of said second signal from said threshold level, and for biasing said inverter to generally operate in said linear operating region.

2. The circuit apparatus defined in claim 1 wherein said bias means comprises means operative to vary the polarity of said bias signal in response to variations of the level of said second signal above and below said threshold level.

3. The circuit defined in claim 1 including high output impedance pre-amplifier means connected to said inverter for providing a high-impedance source of said receive signal to said inverter.

4. The circuit apparatus defined in claim 1 including trigger circuit means connected to said inverter for converting said first signal, into digital data output pulses.

5. The circuit apparatus defined in claim 4 wherein said trigger circuit means comprises means for generating a digital data output pulse when the level of said first signal rises above a first selected reference value and for terminating said pulse when said level falls below a second selected reference value, said first and second reference values being pre-selected as a function of said threshold level so that said digital data output pulses correspond in time with data pulses of said transmitted, data-encoded signal.

6. The circuit apparatus defined in claim 1 wherein said means responsive to said bias signal includes current source means having current flow adjustable in response to the level of said bias signal to control the level of input current to said inverter for biasing said inverter.

* * * * *